US012625972B2

(12) United States Patent
Hendela et al.

(10) Patent No.: US 12,625,972 B2
(45) Date of Patent: May 12, 2026

(54) COMPARATIVE ANALYSIS OF BINARIES FOR SOFTWARE SUPPLY CHAIN SECURITY

(71) Applicant: KARAMBIT.AI INC., Annandale, VA (US)

(72) Inventors: Andrew Aarne Hendela, Annandale, VA (US); Eric Hyunjoon Lee, Jr., Sterling, VA (US)

(73) Assignee: KARAMBIT.AI INC., Annandale, VA (US)

(*) Notice: Subject to any disclaimer, the term of this patent is extended or adjusted under 35 U.S.C. 154(b) by 252 days.

(21) Appl. No.: 18/514,034

(22) Filed: Nov. 20, 2023

(65) Prior Publication Data

US 2024/0176891 A1     May 30, 2024

Related U.S. Application Data

(60) Provisional application No. 63/427,965, filed on Nov. 25, 2022.

(51) Int. Cl.
| | |
|---|---|
| *G06F 21/56* | (2013.01) |
| *G06F 8/65* | (2018.01) |
| *G06F 11/3604* | (2025.01) |
| *G06F 21/57* | (2013.01) |

(52) U.S. Cl.
CPC .............. *G06F 21/577* (2013.01); *G06F 8/65* (2013.01); *G06F 11/3604* (2013.01)

(58) Field of Classification Search
None
See application file for complete search history.

(56) References Cited

U.S. PATENT DOCUMENTS

| | | | | |
|---|---|---|---|---|
| 9,781,148 B2 * | 10/2017 | Mahaffey | .............. | H04W 12/02 |
| 10,509,911 B2 * | 12/2019 | Mahaffey | ............. | H04L 63/0227 |
| 10,657,258 B2 * | 5/2020 | Harms | .................. | G06F 21/566 |
| 2014/0026129 A1 * | 1/2014 | Powell | ...................... | G06F 8/65 |
| | | | | 717/170 |
| 2015/0254161 A1 * | 9/2015 | Baril | ................... | G06F 11/3616 |
| | | | | 717/124 |
| 2015/0254165 A1 * | 9/2015 | Baril | ................... | G06F 11/3698 |
| | | | | 714/38.1 |
| 2018/0046562 A1 * | 2/2018 | Yu | .......................... | G06F 11/362 |
| 2019/0050562 A1 * | 2/2019 | Rhee | ..................... | G06F 21/566 |
| 2021/0056209 A1 * | 2/2021 | Fox | ........................ | G06F 21/563 |
| 2021/0165731 A1 * | 6/2021 | Ross | ..................... | G06F 21/577 |

* cited by examiner

*Primary Examiner* — Christopher B Robinson
(74) *Attorney, Agent, or Firm* — PATENT PORTFOLIO BUILDERS PLLC

(57) ABSTRACT

Comparing how behaviors, functions, and other features have changed between different software versions, embodiments determine how the software has changed between versions and make an assessment as to whether or not the newer version of the software has unintended functionality.

18 Claims, 13 Drawing Sheets

102

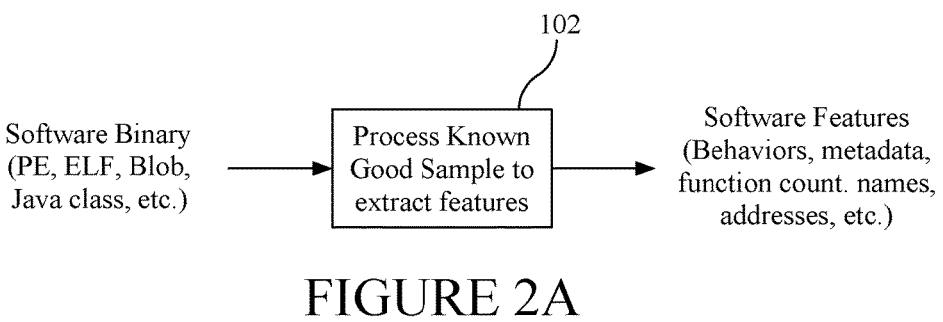

Software Binary
(PE, ELF, Blob,
Java class, etc.)    →    Process Known
Good Sample to
extract features    →    Software Features
(Behaviors, metadata,
function count. names,
addresses, etc.)

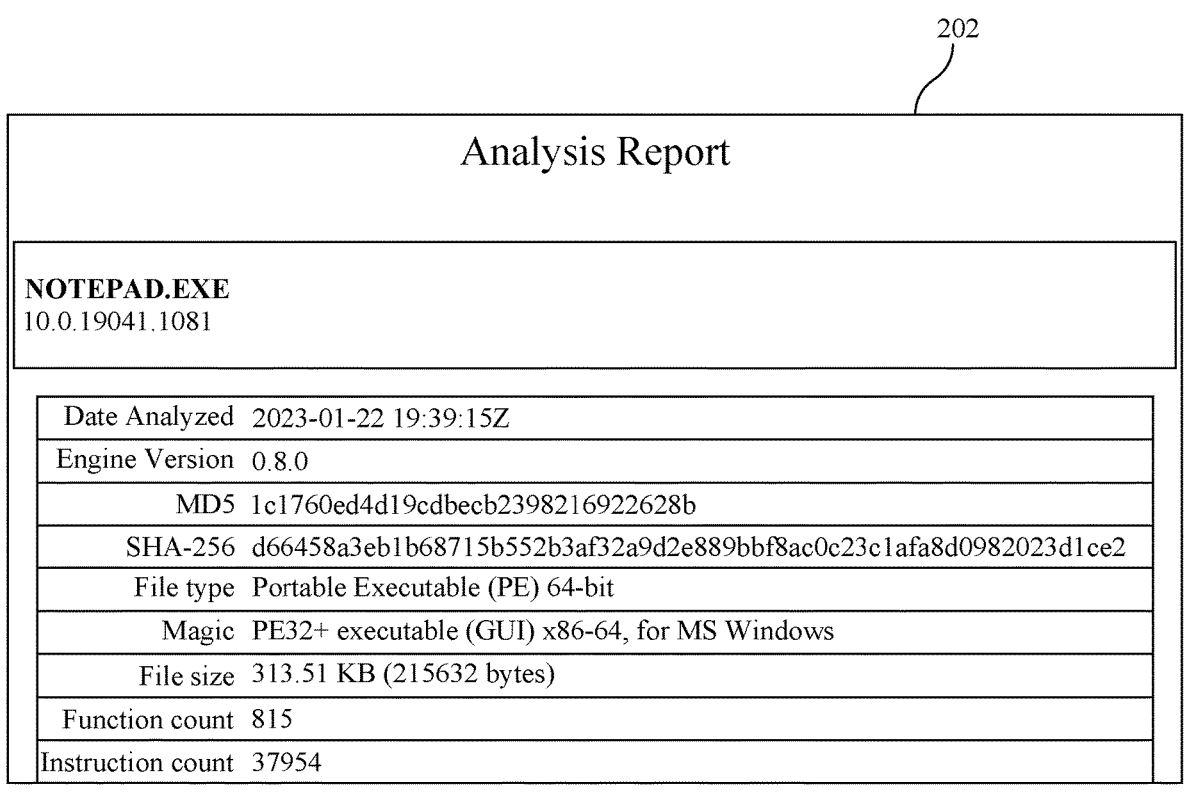

Analysis Report

NOTEPAD.EXE
10.0.19041.1081

| | |
|---|---|
| Date Analyzed | 2023-01-22 19:39:15Z |
| Engine Version | 0.8.0 |
| MD5 | 1c1760ed4d19cdbecb2398216922628b |
| SHA-256 | d66458a3eb1b68715b552b3af32a9d2e889bbf8ac0c23c1afa8d0982023d1ce2 |
| File type | Portable Executable (PE) 64-bit |
| Magic | PE32+ executable (GUI) x86-64, for MS Windows |
| File size | 313.51 KB (215632 bytes) |
| Function count | 815 |
| Instruction count | 37954 |

| Bill of Behaviors | |
|---|---|
| ANTI-ANALYSIS | |
| • execute anit-debugging instructions | 0.012% |
| COLLECTION | |
| • get geographical location | 0.079% |
| COMMUNICATION | |
| • check HTTP status code | 0.151% |
| DATA-MANIPULATION | |
| • encode data using XOR | 0.239% |
| • hash data using murmur3 | 0.041% |
| • validate payment card number using luhn algorithm | 0.012% |
| EXECUTABLE | |
| • contain a resource (.rsrc) section | 0.869% |
| • contains PDB path | 0.795% |
| • extract resource via kernel32 functions | 0.056% |
| HOST-INTERACTION | |
| • accept command line arguments | 0.103% |
| • check if file exists | 0.067% |
| • check mutex and exit | 0.035% |
| • create directory | 0.056% |
| • create mutex | 0.052% |
| • create or open register key | 0.354% |
| • create process on Windows | 0.044% |
| • create thread | 0.244% |
| • delete file | 0.116% |
| • delete registry key | 0.085% |
| • get disk size | 0.01% |
| • get file attributes | 0.175% |
| • get graphical window text | 0.009% |
| • get keyboard layout | 0.003% |
| • get number of processors | 0.026% |
| • hide graphical window | 0.004% |
| • open clipboard | 0.003% |
| • print debug messages | 0.403% |
| • query or enumerate registry value | 0.363% |
| • read file on Windows | 0.548% |
| • set registry value | 0.245% |
| • terminate process via fastfail | 0.412% |
| • write file on Windows | 0.256% |
| LINKING | |
| • link function at runtime on Windows | 0.181% |
| • link many functions at runtime | 0.073% |
| LOAD-CODE | |
| • enumerate PE sections | 0.206% |
| • parse PE header | 0.363% |
| TARGETING | |
| • identifying system language via API | 0.01% |

FIGURE 2C

| | |
|---|---|
| 1400022F4<br>read file on Windows | 1400025E4<br>terminate process via fastfail |
| 1400027C0<br>link function at runtime on Windows | 140002914<br>print debug messages<br>read file on Windows |
| 140002FFC<br>terminate process via fastfail | 14000392C<br>read file on Windows |
| 140003B00<br>read file on Windows | 140003C60<br>link function at runtime on Windows |
| 140003CE0<br>link function at runtime on Windows | 140003D60<br>link function at runtime on Windows |
| 140003DF4<br>link function at runtime on Windows | 140003E9C<br>link function at runtime on Windows |
| 14000476C<br>link function at runtime on Windows | 140004C7C<br>link function at runtime on Windows |
| 140004CF0<br>link function at runtime on Windows | 14000673C<br>create thread<br>read file on Windows |

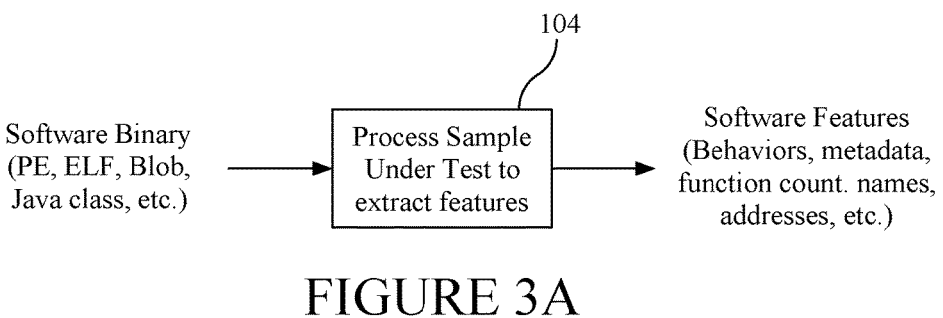

Software Binary (PE, ELF, Blob, Java class, etc.) → Process Sample Under Test to extract features → Software Features (Behaviors, metadata, function count. names, addresses, etc.)

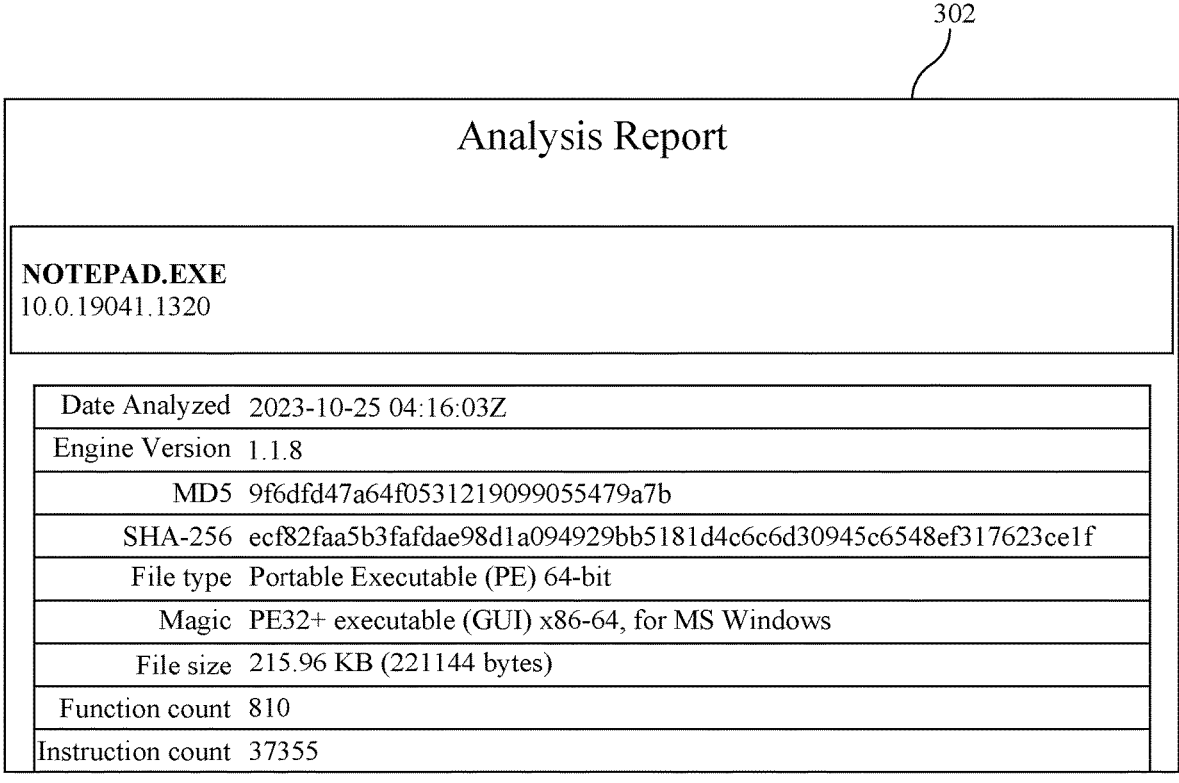

Analysis Report

NOTEPAD.EXE
10.0.19041.1320

| | |
|---|---|
| Date Analyzed | 2023-10-25 04:16:03Z |
| Engine Version | 1.1.8 |
| MD5 | 9f6dfd47a64f0531219099055479a7b |
| SHA-256 | ecf82faa5b3fafdae98d1a094929bb5181d4c6c6d30945c6548ef317623ce1f |
| File type | Portable Executable (PE) 64-bit |
| Magic | PE32+ executable (GUI) x86-64, for MS Windows |
| File size | 215.96 KB (221144 bytes) |
| Function count | 810 |
| Instruction count | 37355 |

| Bill of Behaviors | |
|---|---|
| ANTI-ANALYSIS | |
| • execute anit-debugging instructions | 0.012% |
| COLLECTION | |
| • get geographical location | 0.078% |
| COMMUNICATION | |
| • check HTTP status code | 0.151% |
| DATA-MANIPULATION | |
| • encode data using XOR | 0.238% |
| • hash data using murmur3 | 0.041% |
| • validate payment card number using luhn algorithm | 0.012% |
| EXECUTABLE | |
| • contain a resource (.rsrc) section | 0.869% |
| • contains PDB path | 0.796% |
| • extract resource via kernel32 functions | 0.056% |
| HOST-INTERACTION | |
| • accept command line arguments | 0.103% |
| • check if file exists | 0.067% |
| • check mutex and exit | 0.035% |
| • create directory | 0.056% |
| • create mutex | 0.052% |
| • create or open register key | 0.354% |
| • create process on Windows | 0.044% |
| • create thread | 0.244% |
| • delete file | 0.115% |
| • delete registry key | 0.085% |
| • get disk size | 0.01% |
| • get file attributes | 0.175% |
| • get graphical window text | 0.009% |
| • get keyboard layout | 0.003% |
| • get number of processors | 0.026% |
| • hide graphical window | 0.004% |
| • open clipboard | 0.003% |
| • print debug messages | 0.403% |
| • query or enumerate registry value | 0.363% |
| • read file on Windows | 0.548% |
| • set registry value | 0.245% |
| • terminate process via fastfail | 0.413% |
| • write file on Windows | 0.256% |
| LINKING | |
| • link function at runtime on Windows | 0.181% |
| • link many functions at runtime | 0.073% |
| LOAD-CODE | |
| • enumerate PE sections | 0.206% |
| • parse PE header | 0.363% |
| OTHER | |
| • create process on Windows via DelayLoad API | 0.0% |
| TARGETING | |
| • identifying system language via API | 0.01% |

FIGURE 3C

Figure 3D:
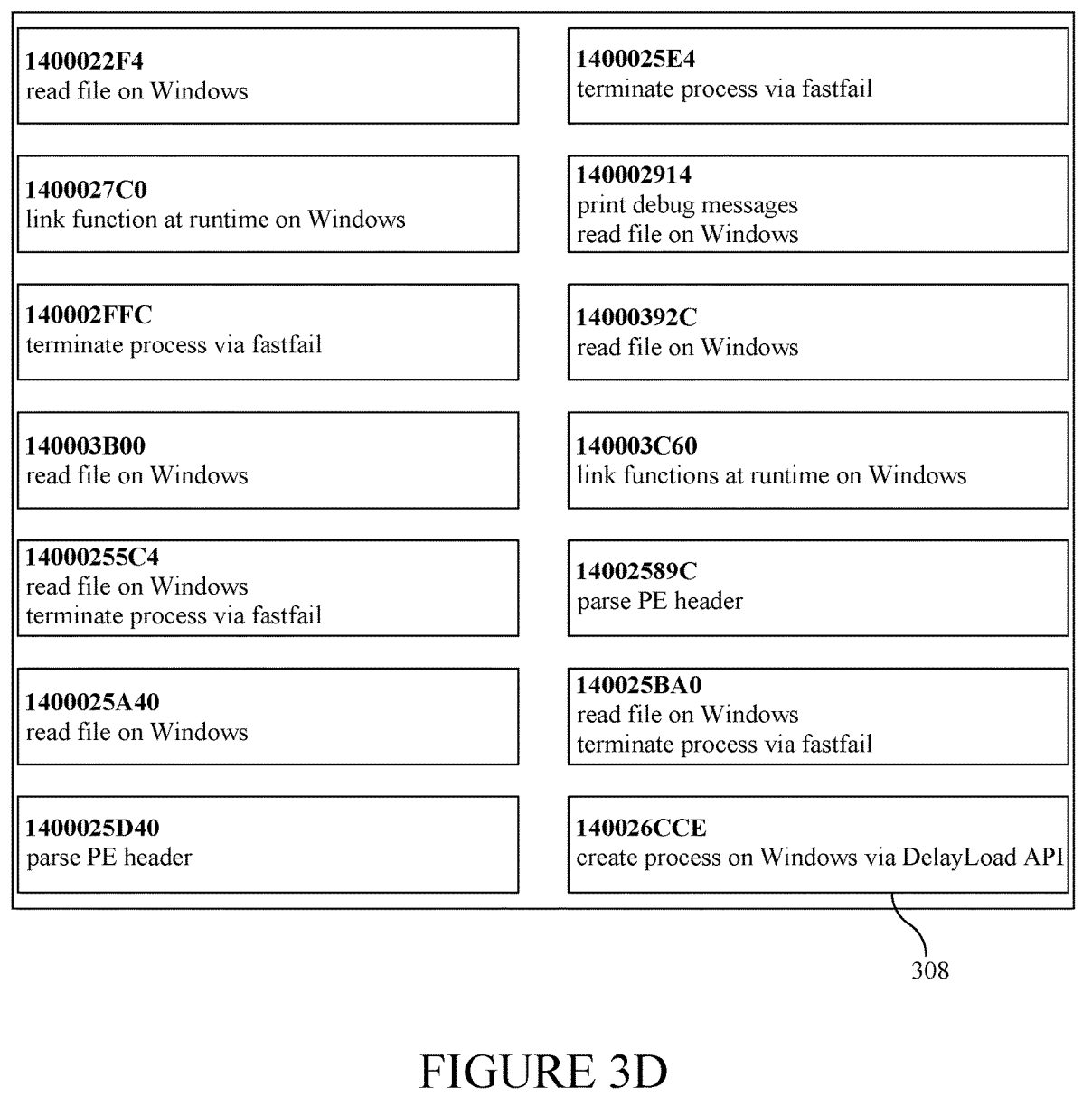

1400022F4
read file on Windows

1400025E4
terminate process via fastfail

1400027C0
link function at runtime on Windows

140002914
print debug messages
read file on Windows

140002FFC
terminate process via fastfail

14000392C
read file on Windows

140003B00
read file on Windows

140003C60
link functions at runtime on Windows

14000255C4
read file on Windows
terminate process via fastfail

14002589C
parse PE header

1400025A40
read file on Windows

140025BA0
read file on Windows
terminate process via fastfail

1400025D40
parse PE header

140026CCE
create process on Windows via DelayLoad API

Software features from two samples → Align functions → List of similar functions and similarity between the functions

108

List of behaviors for each software and function alignment → Compare Behaviors → List of differences in behaviors between samples and their locations within the software create process on Windows via DelayLoad API    ☐ Before: 0 → x ☐ After: 1

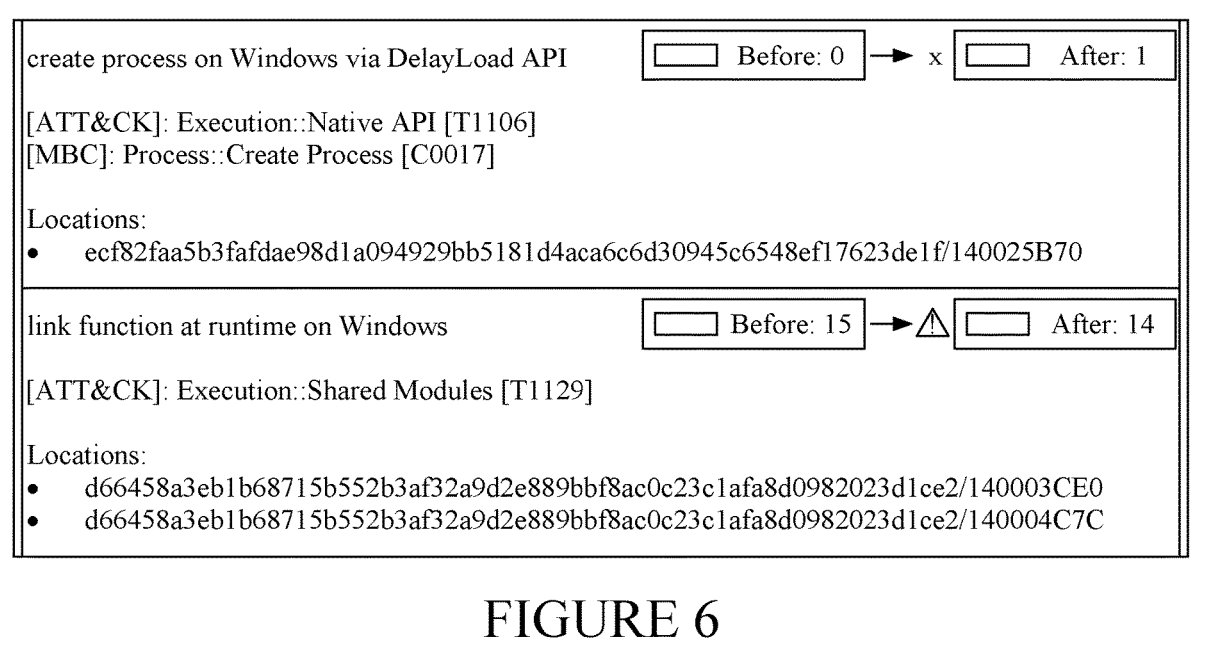

[ATT&CK]: Execution::Native API [T1106]
[MBC]: Process::Create Process [C0017]

Locations:
- ecf82faa5b3fafdae98d1a094929bb5181d4aca6c6d30945c6548ef17623de1f/140025B70 link function at runtime on Windows    ☐ Before: 15 → ⚠ ☐ After: 14

[ATT&CK]: Execution::Shared Modules [T1129]

Locations:
- d66458a3eb1b68715b552b3af32a9d2e889bbf8ac0c23c1afa8d0982023d1ce2/140003CE0
- d66458a3eb1b68715b552b3af32a9d2e889bbf8ac0c23c1afa8d0982023d1ce2/140004C7C

FIGURE 6

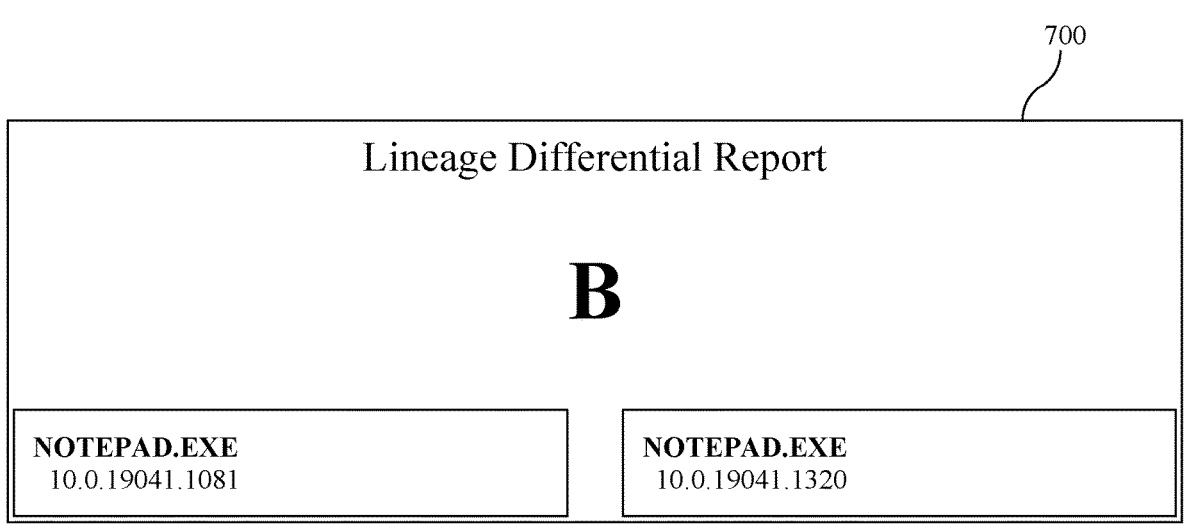

700

Lineage Differential Report

B

| NOTEPAD.EXE | NOTEPAD.EXE |
|---|---|
| 10.0.19041.1081 | 10.0.19041.1320 |

FIGURE 7

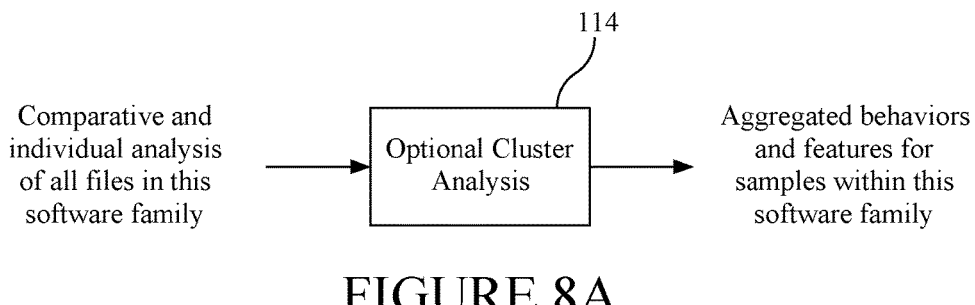

114

Comparative and individual analysis of all files in this software family → Optional Cluster Analysis → Aggregated behaviors and features for samples within this software family

FIGURE 8A

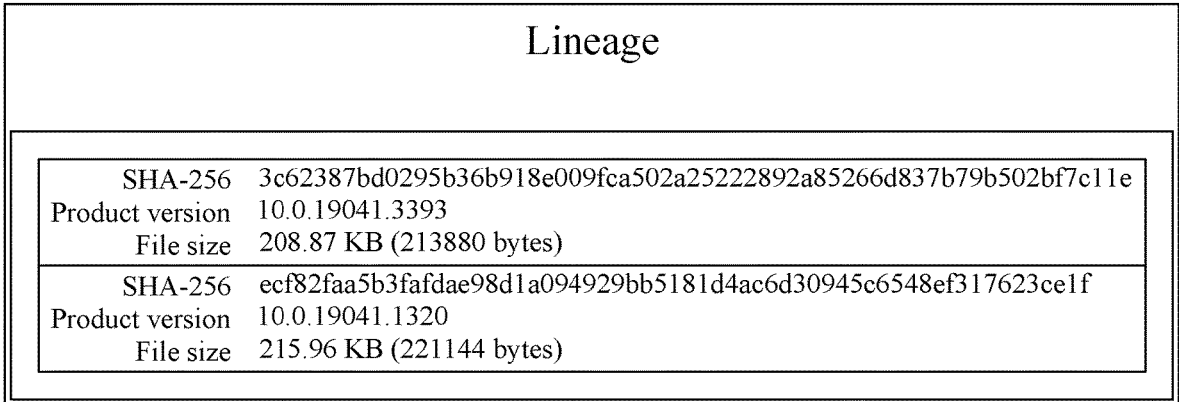

Lineage

| SHA-256 | 3c62387bd0295b36b918e009fca502a25222892a85266d837b79b502bf7c11e |
|---|---|
| Product version | 10.0.19041.3393 |
| File size | 208.87 KB (213880 bytes) |
| SHA-256 | ecf82faa5b3fafdae98d1a094929bb5181d4ac6d30945c6548ef317623ce1f |
| Product version | 10.0.19041.1320 |
| File size | 215.96 KB (221144 bytes) |

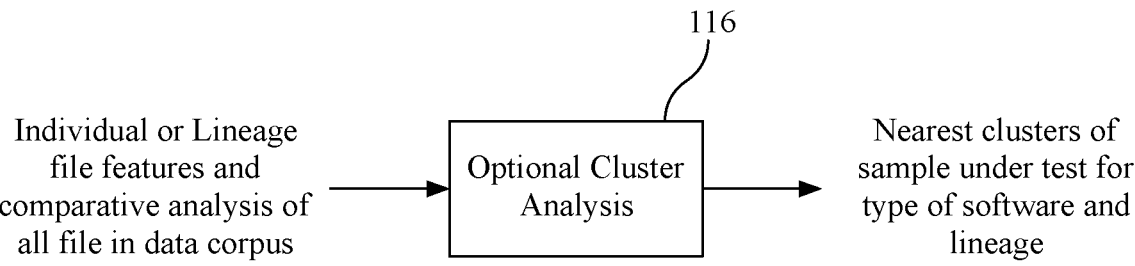

Individual or Lineage file features and comparative analysis of all file in data corpus → Optional Cluster Analysis → Nearest clusters of sample under test for type of software and lineage

FIGURE 9

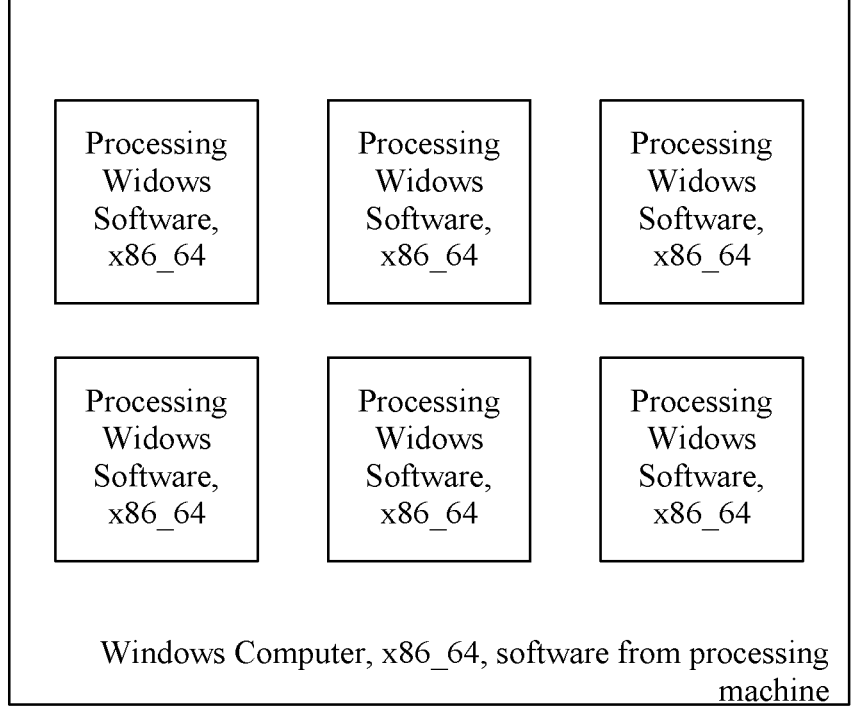

| Processing Widows Software, x86_64 | Processing Widows Software, x86_64 | Processing Widows Software, x86_64 |

| Processing Widows Software, x86_64 | Processing Widows Software, x86_64 | Processing Widows Software, x86_64 |

Windows Computer, x86_64, software from processing machine

FIGURE 10

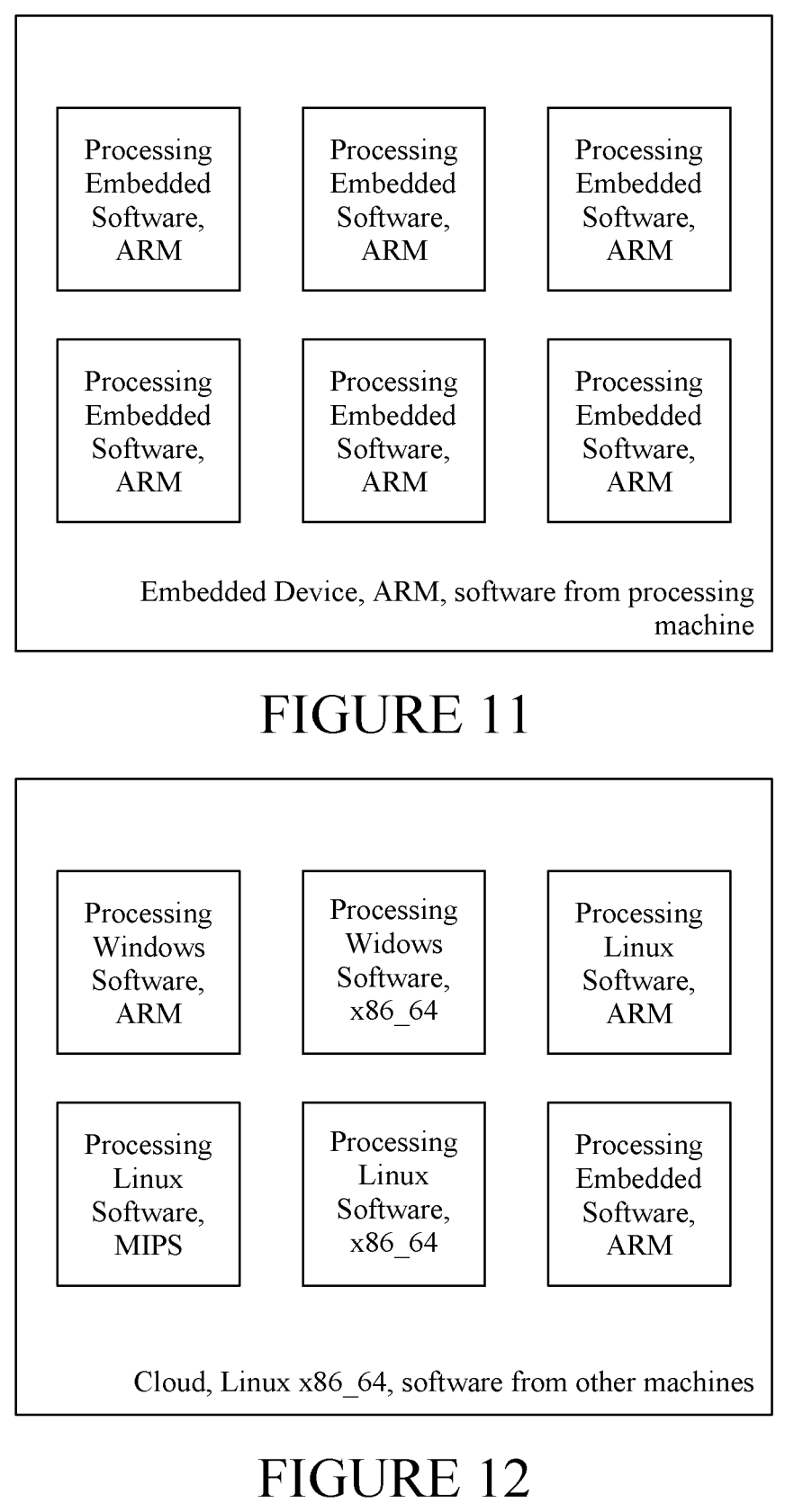

| Processing Embedded Software, ARM | Processing Embedded Software, ARM | Processing Embedded Software, ARM |
|---|---|---|
| Processing Embedded Software, ARM | Processing Embedded Software, ARM | Processing Embedded Software, ARM |

Embedded Device, ARM, software from processing machine

FIGURE 11

| Processing Windows Software, ARM | Processing Widows Software, x86_64 | Processing Linux Software, ARM |
|---|---|---|
| Processing Linux Software, MIPS | Processing Linux Software, x86_64 | Processing Embedded Software, ARM |

Cloud, Linux x86_64, software from other machines

FIGURE 12

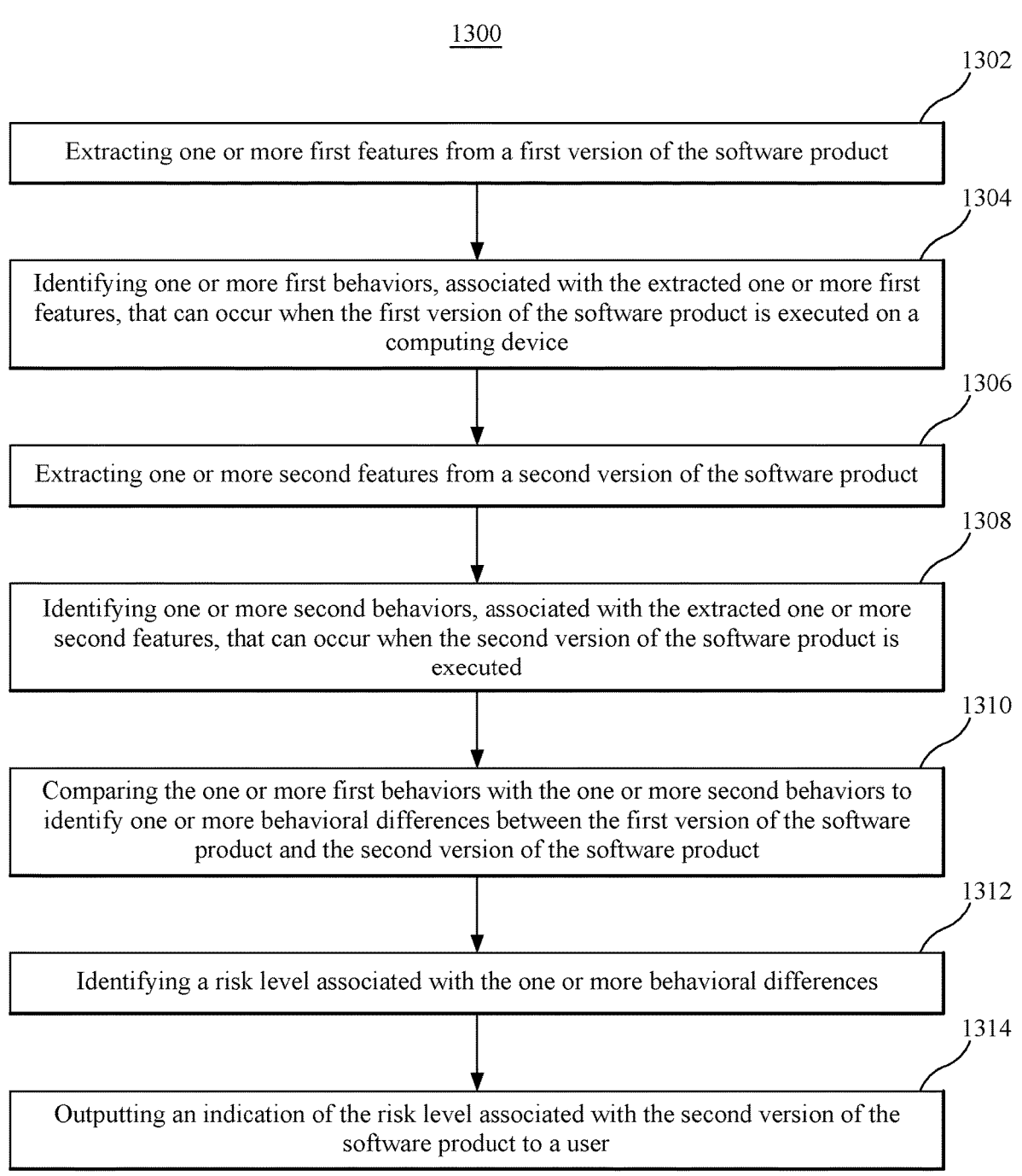

1300

1302

Extracting one or more first features from a first version of the software product

1304

Identifying one or more first behaviors, associated with the extracted one or more first features, that can occur when the first version of the software product is executed on a computing device

1306

Extracting one or more second features from a second version of the software product

1308

Identifying one or more second behaviors, associated with the extracted one or more second features, that can occur when the second version of the software product is executed

1310

Comparing the one or more first behaviors with the one or more second behaviors to identify one or more behavioral differences between the first version of the software product and the second version of the software product

1312

Identifying a risk level associated with the one or more behavioral differences

1314

Outputting an indication of the risk level associated with the second version of the software product to a user

FIGURE 13

COMPARATIVE ANALYSIS OF BINARIES FOR SOFTWARE SUPPLY CHAIN SECURITY

RELATED APPLICATION

This application claims priority from, and incorporates by reference, U.S. Provisional Patent Application No. 63/427,965, entitled "Comparative Analysis of Binaries for Software Supply Chain Security", filed on Nov. 25, 2022.

TECHNICAL FIELD

Some embodiments of the subject matter disclosed herein generally relate to methods and systems for performing comparative analysis of software to determine whether, for example, updates or new versions of software are malicious or benign.

BACKGROUND

The SolarWinds software supply chain attack compromised 18,000 organizations of all sizes and caused billions of dollars in damage. This attack exploited the trust consumers have in their third-party suppliers. The attackers added malicious code, not in the software repository, but within a compromised build system. The current state of the art in this area focuses on finding vulnerabilities, understanding the composition of the software, or prohibitively expensive manual analysis.

Methods to understand the composition of software, known as Software Composition Analysis (SCA), lead to the creation of a Software Bill of Materials (SBOM). Current cyber risk management policies revolve around SBOM. An SBOM is a list of components in a piece of software, analogous to the ingredients list for food products. Executive Order 14028 and FDA requirements (FDA 2023) mandate the adoption and production of SBOMs for federal government vendors and internet-connected medical device manufacturers, respectively.

Yet, the basic level of understanding provided by SBOM techniques has severe limitations. For example, SBOMs provide a list of components but not the other information required for cyber risk assessment. Critically, SBOMs are incapable of answering the cyber risk question posed above: simply knowing the present vulnerabilities and software components cannot determine the live impact of the final software deliverable. Further necessary information would include those components' vulnerability, functionality, and behavior information.

Understanding vulnerability information is a use case for SBOMs and the related concept of the Vulnerability Exploitability exchange (VEX). By linking known vulnerabilities with SBOMs, end users can know the potential harm of a software exploit. However, only linking with known vulnerability databases often leads to false positives that waste precious cyber analyst time and attention. For example, the 60 known false positives within Grype in August 2023, the open-source vulnerability scanner, show this problem with false positives using conventional techniques. The SolarWinds attack mentioned above is another salient example of the deficiencies of SBOM and vulnerability approaches since SBOMs and vulnerability analysis only provide knowledge of vulnerabilities that may be exploited by an attacker.

Accordingly, it would be desirable to create systems, devices, methods, and software applications that overcome these, and other, drawbacks and problems associated with conventional software analysis.

SUMMARY

According to an embodiment, comparing how behaviors, functions, and other features have changed between different software versions, embodiments determine how the software has changed between versions and make an assessment as to whether or not the newer version of the software has unintended functionality.

According to an embodiment, a method for identifying a risk level associated with an update to a software product includes extracting one or more first features from a first version of the software product; identifying one or more first behaviors, associated with the extracted one or more first features, that can occur when the first version of the software product is executed on a computing device; extracting one or more second features from a second version of the software product; identifying one or more second behaviors, associated with the extracted one or more second features, that can occur when the second version of the software product is executed; comparing the one or more first behaviors with the one or more second behaviors to identify one or more behavioral differences between the first version of the software product and the second version of the software product; identifying a risk level associated with the one or more behavioral differences; and outputting an indication of the risk level associated with the second version of the software product to a user.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 2A-2D illustrate various aspects associated with feature and behavior extraction from a good or known sample of a software product according to embodiments;

FIGS. 3A-3D illustrate various aspects associated with feature and behavior extraction from a sample under test of a software product according to embodiments;

FIG. 6 shows additional details of the output of FIG. 5;

FIG. 7 shows a lineage differential report according to an embodiment;

FIGS. 8A and 8B depict various aspects of optional lineage analysis according to an embodiment;

FIG. 9 illustrates various aspects of optional cluster analysis according to an embodiment;

FIGS. 10-12 graphically illustrate various hardware environment usable by embodiments; and FIG. 13 is a flow chart illustrating a method according to an embodiment.

DETAILED DESCRIPTION

Figure 1:
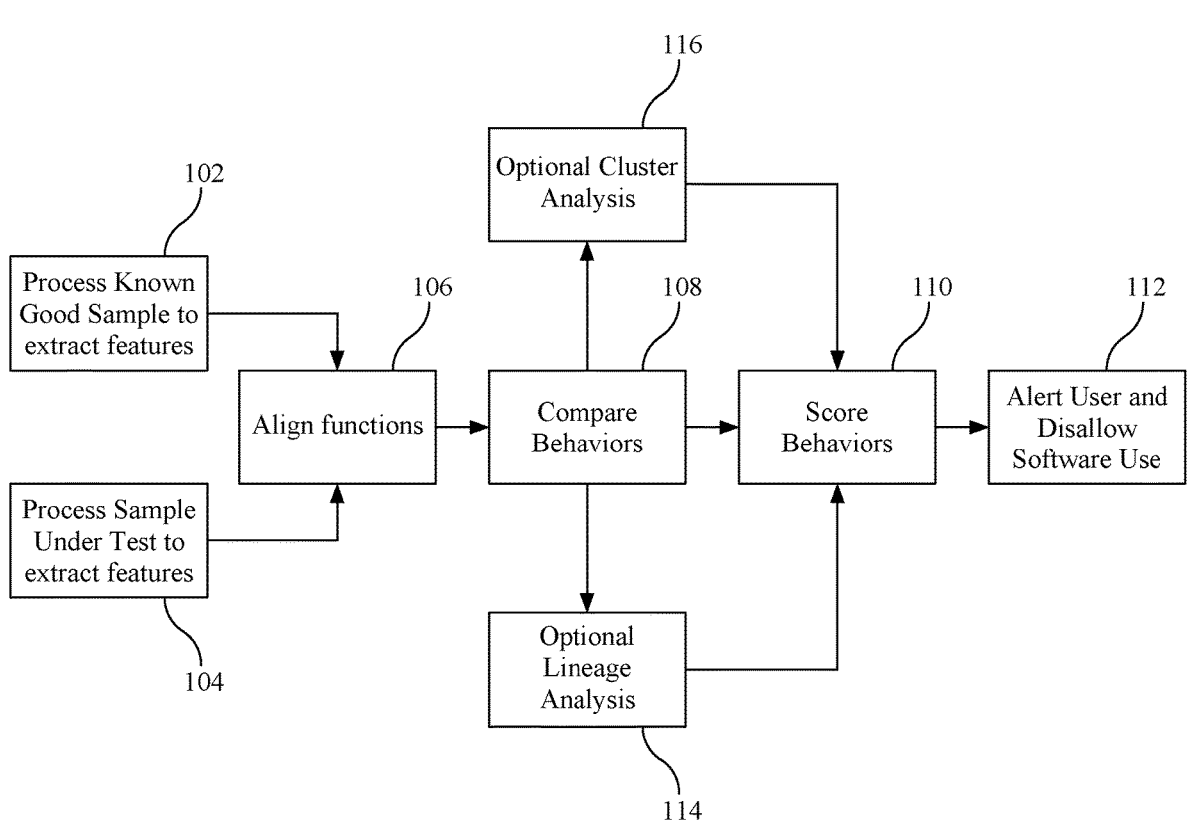
FIG. 1 is a block diagram depicting a method and a system for comparative analysis of binaries according to embodiments.

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification does not necessarily refer to the same embodiment. Further, the particular features, structures, or characteristics may be combined in any suitable manner in one or more embodiments.

As mentioned above, when implementing, for example, comparative behavior-based software analysis according to various embodiments, systems, and methods compare how behaviors, functions, and other features in software have changed between, for example, different software versions. More specifically, embodiments determine how the software has changed between versions and make an assessment as to whether or not the newer version of the software has unintended functionality, i.e., functionality in the software that the developer and/or user did not intend the software to exhibit.

As one example, embodiments gather data on and then compare two pieces of software to determine if an update has changed the intent of the software from benign to malicious. These embodiments gather function data and metadata, as well as functionality based on rules and other methods, which will be described in more detail below. These gathered pieces of data are then compared using algorithms, heuristics, and applications of machine learning and artificial intelligence. This keeps software end-users safe without the need for source code or execution of the software.

According to some embodiments, "malicious software" is software that behaves in a way that the end user and/or the developer do not intend. In this context as used herein "behavior" can be considered to be the actions, responses, and outcomes that occur from a software program or system in response to execution of the software or system, or in response to input. Behavior encompasses the way in which the software interacts with users, data, and the tasks it performs.

As a surrogate for determining whether software behaviors are intended (or not) by the end user and/or the developer, embodiments use the following: the combination of newly added behaviors, unexpected behaviors for this type of software, and/or behaviors associated with malware. If the behaviors of the new version (or update) of the software are out of line with the historical behaviors and intent of the software, these behaviors are flagged as malicious. Conversely, behaviors of the new version (or update) of the software that are identified as intended (or likely intended) behaviors are flagged as benign, even if those behaviors are newly adopted into the newer software version. Embodiments provide for determining this historical context of the software automatically and using that context to detect changes to developer intent.

Embodiments described herein can operate on multiple kinds of hardware, including embedded systems and cloud computing hardware, processors including x86, x64, ARM, MIPS, and embedded processors, and operating systems, such as Windows and Linux as will be described in more detail below.

FIG. 1 is a flow diagram that illustrates a method 100 for comparative behavior-based software analysis according to an embodiment. It will be appreciated that each block illustrated in FIG. 1 can be implemented as one or more software modules running on one or more hardware systems/processors as described below. Therein, the system gathers data at steps 102 and 104 to prepare for subsequent comparative behavior analysis. In step 102, also shown in FIG. 2A, a good sample of the software to be analyzed (or, more generally, a base sample if a known good sample is not available) is processed to extract various features and functions that indicate the good sample's behaviors. In this context, a "function" can be considered to be one of the basic building blocks of code within a software program that is designed to be reusable and performs a certain behavior or set of behaviors. A function is intended to make software more modular, maintainable, and more easy to reason about. A "feature" can be considered to be an individual measurable property or characteristic of data that is used as input for algorithms. Feature can also be considered to be a generic term for an attribute or variable that is used to make predictions or decisions.

The input to step/module 102 can be, for example, a software binary, e.g., Portable Executable (PE), Executable and Linkable Format (ELF), binary blob, Java class, and other file formats). The features extracted from step 102 inform the system regarding the baseline intent of the software. The good or known sample input to step 102 need not be a single version or update of a piece of software. Alternatively, multiple versions of this software can be processed and the results aggregated into a base software lineage to compare to the sample under test. If no previous sample can be found for this software family, features can be compared to the overall corpus to establish baseline intent. In the case of no previous sample being found, for instance for the first time a software family is being used, the features will be compared to an aggregation of the features from the overall corpus. One method for this is to find a centroid of the corpus for the feature set and use this aggregate result as the baseline intent.

To better understand the general embodiment illustrated in FIG. 1, a description of how that embodiment operates to compare behaviors between two versions of note-taking software will be provided in parallel with the description of the method and system shown therein. For example, FIG. 2B shows an analysis report 202 generated by an embodiment that provides a comparative analysis of two versions of notepad.exe: i.e., version 10.0.19041.1081 shown as the good/known version 202 in FIG. 2B. Some of the features extracted in step 102, and subsequently used to perform the comparative behavior analysis, can be seen in FIG. 2B including the name, version, MD5, SHA-256 (a cryptographic hash of the software binary), file type, file Magic, file size, function count, and instruction count. Each feature that can be extracted from a type or piece of software, is extracted if possible. For instance, the version information for a piece of software is embedded in the PE-file specification and is extracted if it exists, however there is no standardized way to express version information within an ELF file. As such, some ELF files will not have version information or it may be collected from a metadata file associated with the ELF file. As many or as few features gathered are used in subsequent steps. More features may be gathered than are shown in FIG. 2B.

Behaviors are also extracted as output from the "Process Known Good Sample" block 102 as seen in the behavior list 204 in FIG. 2C for the 1081 version of the notepad.exe software. One method that can be used to extract these features is the Ghidra Software Reverse Engineering Framework, which disassembles the binary and, from each function within the binary and the binary itself, returns the extracted features that are then used to determine the behaviors within the function. The features used to identify behaviors that could occur when executing this "good sample" include systems calls (such as send and recv for network communications), strings, arguments to function calls, instructions, file sections, and aggregations of other behaviors detected for higher-order behaviors (such as the combination of creating a socket then sending data on that socket).

As shown in FIG. 2D, the "Process Known Good Sample" block 102 also links behaviors at the function level, giving data for function alignment and behavioral similarity detection. The bolded hexadecimal numbers in each block in FIG. 2D are the memory addresses of the functions, and the behaviors contained within that function are shown within the box. This data also informs the scoring and anomaly detection algorithms.

These behaviors are aggregated under different types of behavior classes, including anti-analysis, collection of data, communication, data manipulations, executable metadata, host interaction, linking, load-code, and targeting, as also seen in FIG. 2C. Embodiments described herein aggregate behaviors into these clusters as this provides a more general way of determining what types of behaviors occur. While not all behaviors within a given cluster are the same, a given class of behaviors can inform the intent of the software and how it changes between versions. These behaviors and classes inform the scoring algorithms. For example, in the case of detecting the behavior "link function at runtime on Windows" (seen in both FIGS. 2C and 2D) embodiments use the feature of a call to the GetProcAddress function extracted at block 102 as part of the identification of this specific behavior. Aggregating many of these behaviors, e.g., nine such instances in FIG. 2D, allows embodiments to detect the "link many functions at runtime" behavior seen in FIG. 2C.

Similarly, and also as shown in FIG. 2C, features are gathered from the percentages of how often each behavior is observed within the entire corpus of software that has been processed in block 102. In the Bill of Behaviors 204, behaviors that occur less frequently than a threshold, which can be a customizable percentage of how often that behavior is detected per the overall number of behaviors detected within the dataset, are shown in bold, i.e., "get disk size", "get graphical window text", "get keyboard layout", "hide graphical layout", "open clipboard" and "identify system language via API" in this example. Those behaviors that occur less frequently than the threshold are determined to be more anomalous behaviors than behaviors above the threshold that occur more frequently. This can inform the scoring system or an end user.

In the context of step 102 (and also step 104 described below), a non-exhaustive list of types of features, functions and behaviors extracted from (or identified in) a piece of software according to various embodiments includes one or more of: filename; version; developer; published; file hashes; section hashes; imports; libraries used; file type; function location, function hashes; function position independent hashes; function behaviors based on heuristics, algorithms, rules, and applications of machine learning and artificial intelligence; function basic block location, function basic block hashes; function basic block position independent hashes; function basic block behaviors based on heuristics, algorithms, rules, and applications of machine learning and artificial intelligence; relationships between functions and function basic blocks; relationships between functions caller and callees; relationships between function basic blocks instruction flow and functions; relationships between functions and libraries called; and relationships between function basic blocks and libraries called. Of these features, the combinations of function basic block behaviors, the relationships between basic blocks and functions, and relationships between functions' caller and callees, allows the embodiments the important ability to chain together behaviors to determine where and how software has changed between versions. This can be used to know if the addition of a behavior in a particular place in the software is more or less unintended based on similarity in surrounding behaviors between versions. Similarly, adding to that the relationships between functions and libraries called in conjunction with locations of those behaviors can have a similar effect, but within a full system, rather than individual binaries. These features, i.e., using the relationships of behaviors to basic blocks, to functions, and to software allow approaches according to embodiments to work not just on individual binaries, but on full software systems.

Returning to FIG. 1, and similar to step 102, features, behaviors, and functions are also extracted (or identified) at step 104 by processing the sample under test, e.g., a newer version or an update of the software, which is likewise input as a software binary to step/module 104. In this example, the version of notepad.exe is 10.0.19041.1320, i.e., the sample under test and sometimes referred to herein as the "1320" version. FIG. 3A shows this step in more detail. For the sample under test, the same features, behaviors, and functions shall, if possible, be extracted/identified at step 104 as were extracted/identified for the good sample at step 102. This sample used in step 104 can be formatted in any of several different file types, including Portable Executable (PE), Executable and Linkable Format (ELF), binary blob, Java class, and other file formats. It is not necessary for the known good sample used in step 102 and the sample under test used in step 104 to be the same format, processor architecture, or operating system, the features extracted will be used as available. The extracted features also inform scoring and anomaly detection algorithms.

The analysis report 302 shown in FIG. 3B shows some of the features extracted as output from the "Process Sample Under Test" block 104. These features are generated from the metadata of the file, including the name, version, MD5, SHA-256, file type, file Magic, file size, function count, and instruction count. Similarly, a list of behaviors 304 generated based on the extracted features is derived for the sample under test as part of step 104. Comparing the list 204 generated for the good sample at step 102 and the list 304 generated for the sample under test at step 104, one can observe (and embodiments can automatically identify) a large number of similarities but at least one difference: the sample under test includes a detected behavior of "create process on Windows via DelayLoad API" which was not a detected behavior of the good sample.

This particular behavior "create process on Windows via DelayLoad API" was identified based on a feature extracted from the sample under test, specifically the feature of a call to the DelayLoad_ShellExecuteW function. This is a rare behavior within our overall data corpus, as identified in FIG. 3C by bold text. Ultimately this newly detected behavior points toward the anomalous condition identified below.

FIG. 3D shows a function address list and corresponding behaviors for the sample under test in a manner analogous to that of FIG. 2D. Again, in the case of detecting the behavior "link function at runtime on Windows" as part of step 104, embodiments use the feature of a call to the GetProcAddress function. Aggregating many of these behaviors allows embodiments to detect the "link many functions at runtime" behavior as seen in FIG. 3C. This is not a rare behavior within the overall corpus, and as such it is printed with unbolded text. FIG. 3D also highlights the presence of the new behavior mentioned above with respect to FIG. 3C. Data is extracted from behaviors and function level for the sample under test as was extracted for the known good sample, and is output from this block 104.

Figure 4:
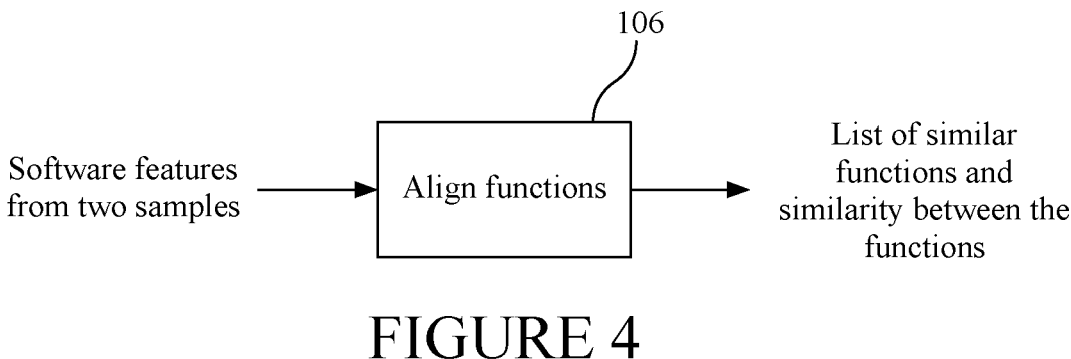
FIG. 4 shows inputs and outputs to an align functions module of the system and method of FIG. 1.
Figure 5:
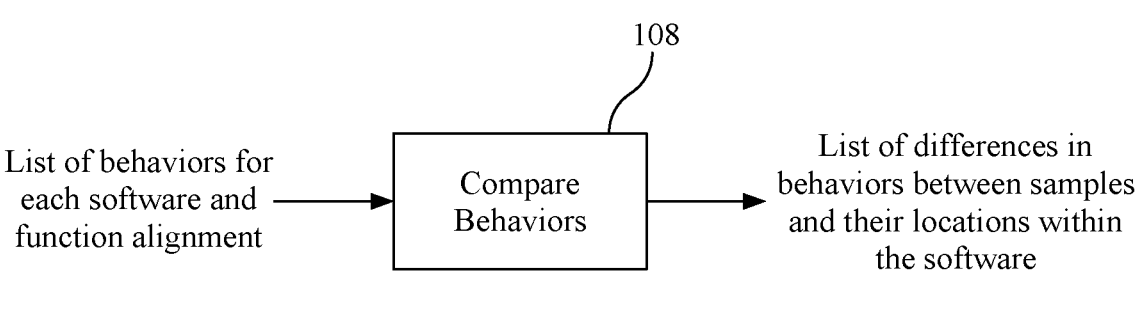
FIG. 5 shows inputs and outputs to a compare behaviors module of the system and method of FIG. 1.

With these sets of features as input, the embodiment of FIG. 1 performs function alignment, if possible, at step 106 and also shown in FIG. 4. Not all functions can or will be aligned, and not every function will have a corollary between any two given software versions. This block 106 generates a Term Frequency-Inverse Document Frequency (TF-IDF) vector from the position-independent code hashes of each function and each block, position dependent code hashes of each function and each block, function name, function identifier, number of blocks in the function, and the number of instructions in the function and uses k-nearest neighbors with cosine similarity to determine which functions between the two samples are most alike.

An example of this calculation is as follows, with simplified TF-IDF vectors for clarity, as the TD-IDF vectors generated can be hundreds of elements in size. For each function a TF-IDF value is calculated for each position-independent code hash and is turned into a TF-IDF vector, in this example we will use [0,1,1,0] for the TF-IDF vector for the main function in the good sample (main_good), [0,1,0.75,0] for the TF-IDF vector for the main function in the sample under test (main_test), and [1,0,0,1] for each other function in the samples. These TF-IDF vectors show much similarity between the position-independent code hashes and other features of main_good and main_test, and no similarity between them This would produce cosine similarity as follows:

$$\text{cosign similarity}_{main_{good} vs\ main_{test}} =$$

$$\frac{main_{good} \cdot main_{test}}{\|main_{good}\| \|main_{test}\|} = \frac{[0, 1, 1, 0] \cdot [0, 1, 0.75, 0]}{\|[0, 1, 1, 0]\| \|[0, 1, 0.75, 0]\|} =$$

$$\frac{1.75}{1.414 + 1.25} = 0.990 \text{ and cosign similarity}_{main_{good} vs\ main_{other}} =$$

$$\frac{main_{good} \cdot main_{other}}{\|main_{good}\| \|main_{other}\|} = \frac{[0, 1, 1, 0] \cdot [1, 0, 0, 1]}{\|[0, 1, 1, 0]\| \|[1, 0, 0, 1]\|} = \frac{0}{1.414 * 1.414} = 0$$

This aligns the main function in the good sample with the main function within the test sample, and does not align the main function with any other function in the sample under test.

This alignment can also use Jaccard similarity on the sets of position-independent code hashes for the function basic blocks. However, this Jaccard similarity score can lead to more false positives. If available, the function name's metadata ("the functions symbols") can also be used for increased accuracy, however these are often not available in practice. Embodiments may also use the set of behaviors of the functions (as seen in FIGS. 2D and 3D) to increase accuracy by finding similar behaviors for each function.

In the example of the NOTEPAD.EXE version comparison used through this document, function metadata is not available, as such, embodiments generate similarity based on the TF-IDF vectors. This can also be used across the corpus of data in the event we are using the optional software lineage or the more general indicators of malicious behaviors within the entire corpus.

The output of block 106 is a list of similar functions for each function within the sample under test, if found, and the similarity between those functions. In this particular example, block 106 will align 14 of the functions with "link function at runtime on Windows" from the good sample with 14 of the 15 functions with this behavior in the sample under test, with 1 function within the known good sample not having an alignment. The one function within the sample under test with the "create process on Windows via Delay-Load API" does not align with any function within the known good sample, and does not have a known similar function.

The list of behaviors and the function alignment output from block 106 are input to block 108 in FIG. 1 (and also in more detail in Figure) to determine what differences have been observed between the sample under test, and the good or previous sample. This process detects the added unintended behavior of "create process on Windows via Delay-Load API." The system determines this behavior to be unintended because the historic behaviors of the software do not include this behavior in addition to its association with malware within the MITRE ATT&CK framework and the Malware Behavior Catalog taxonomies and embodiments' own custom list of behaviors from expert knowledge of attacks. This behavior would allow an attacker to create any process within the Windows® operating system, and would give the attacker control over the computer to create new processes, communicate over the network to control the computer remotely, or simply start the calc.exe calculator process. The single function identified in block 108 as being an anomaly does not have an aligned function in the known good sample, but its location is indicated as being contained at the address 140025B70 within the file under test (file sha256: ecf82faa5b3fafdae98 d1a094929bb5181d4ac6c6d30945c6548ef317623ce1f).

By way of contrast, the "link function at runtime on Windows" behavior is shown to occur at step 108 one less time in the sample under test than it occurred in the good or previous version of the software. This latter change in behavior is not seen as malicious by this embodiment, as it is related to behavior already expected for this software, and does not affect the score.

The output of block 108 is the list of the differences and their locations, an example of which is shown in FIG. 6. The locations in FIG. 6 indicate the file sha256 and the hexadecimal address of the function at issue within the software for the potentially malicious detected behavior 602 and the differential behavior 604 that is not flagged as malicious. In the middle of each block is a reference, if applicable, to the MITRE ATT&CK framework TTP and the Malware Behavior Catalog behavior type and number. These can be used to help inform end users about the uses of a particular behavior within a cyberattack, and are used internally to by embodiments for scoring.

A scoring algorithm is used next in block 110 to categorize a level of suspiciousness regarding the overall difference(s) in behavior(s) between the good sample and the sample under test. As input, the scoring block 110 uses the list of differences in behaviors between the samples and their locations within the software received from block 108. To generate these scores two methods can be used. One scoring system begins at 100.0 and is lowered by 10.5 for each newly added behavior associated with malware activity by the MITRE ATT&CK framework, the Malware Behavior Catalog, or a custom analysis, lowered by 2 for each newly added potentially malicious behavior not categorized by those frameworks, and lowered by 0.5 for each additional instance of the behavior added that was previously observed in the lineage. This is then translated to a letter grade in the following table.

TABLE 1

| Score Above or Equal to | Letter Grade |
| --- | --- |
| 90.0 | A |
| 80.0 | B |
| 70.0 | C |
| 60.0 | D |
| All other scores | F |

In the case of this exemplary comparison between Notepad.exe Version 1081 and Version 1320, the scoring result is 100−10.5=89.5. That is the initial score of 100 lowered by 10.5 for the single instance of "create process on Windows via DelayLoad API," which was never observed within the previous/good sample. The resulting 89.5 is translated to a B score which can be graphically or otherwise output by the system to a user, as shown in FIG. 7. This shows that the newly updated notepad.exe 1320 may have the ability to compromise a computer system or perform risky actions. These scores can optionally be tuned based on expert knowledge or machine learning algorithms such as linear regression or deep neural networks to determine automatically how to lower or raise the score depending on how the different features and behaviors change between sample. This scoring system can be customized to the risk tolerance of a particular user or organization. For instance, if an end user does not want a certain behavior to occur, a set of behaviors to occur together, or a class of behavior to occur in software, such as network communication or anti-analysis, the score for software with this behavior could be lowered entirely based on this behavior, set of behaviors, or class of behaviors existing within the software at all, or the addition of this behavior, set of behaviors, or class of behaviors to the software.

According to another embodiment, an alternative scoring system uses a suspiciousness score based on anomaly detection. This algorithm learns based on all comparisons from all data gathered within the corpus. Anomalies are then detected when an update falls outside of the expected results for an update with this previous version. Depending on the relative rarity of a particular behavior within the corpus, that behavior will become more anomalous. This is depicted in the Bill of Behaviors by a bolded behavior.

Using a manual or automated threshold for the number of anomalies expected for the overall software corpus, machine learning algorithms are trained to determine if a sample under test is normal or anomalous. In the case of the notepad under test, it would be shown to be anomalous based on the addition of the new rare behavior. One method to perform this alternate scoring is by using an unsupervised Isolation Forest (IF) model. This IF model uses the average of multiple decision trees to determine if the sample under test is anomalous or not. This model can be trained on the overall dataset with an intended anomaly percentage and can be used to tune the algorithm to have more or fewer false positives depending on the risk tolerance of the end user.

An alternative method is to use deep neural networks to train an autoencoder for anomaly detection. This is a neural network that takes input and tries to reconstruct it as the output. When the output is not reconstructed correctly, this is detected as an anomalous sample under test. The output of block 110 is the maliciousness score and/or the anomaly detection depending on the scoring system and technique used.

After scoring, the user(s) are alerted of the results at block 112. With this score and/or anomaly detection as input(s), a decision can be made about the software under test. This score threshold may change depending on the risk tolerance for a particular organization. For a low-risk tolerance, the "B" grade for notepad.exe would potentially disallow the software from use. This would be done by not allowing the software under test to be downloaded back into the network until the discovered issue had been resolved, mitigated, or accepted. For a high-risk tolerance organization, it may be allowed. Using the embodiments described herein before software is used within an organization would allow the embodiments to be used to stop those attacks from occurring. In the same way, embodiments can determine if a software comparison is within the risk tolerance level, allowing benign software to be detected as well. This will be done when the software score is high, at an A grade, or when the anomaly detection does not detect anomalous software.

There are other resulting actions that may be taken based on the score, disallowing use is the simplest. One such action is a recommendation for the version of the software that should be used. Using the lineage comparisons of the software, alternative versions with a lower risk score can be suggested for use and allowed to be downloaded for use on the network.

Another such action would be to perform further, deeper automated analysis to gather more features and use more resource intensive algorithms. Some algorithms may not be feasible to be done at the scale of millions of pieces of software under test, but those deemed riskier can then be analyzed in that way. Similarly, high scores may indicate interesting samples for manual analysis. This would be the case for when malware is being analyzed at scale, not every sample can be manually reverse engineered, but the score can be used to trigger an alert for manual analysis for variants of known malware families that have deviated from the known and expected behaviors for that malware family.

In the case of an end user detecting a malicious behavior in a vendor's software, reports with the findings would be generated and automatically sent to the vendor via email or other automated messaging system. Within an organization a report can be sent to an internal cybersecurity Subject Matter Expert or incident responder to triage the software and mitigate or remediate any resulting attacks. This information can also be used to update an overall risk profile of that vendor or source of the software.

In the case of malicious behaviors detected within a developers' network, messages would be generated for the relevant ticketing system with the development environment for triage by developers or cybersecurity experts. This information can also be used to update an overall risk profile of that vendor, source of the software, open source software project, or developer of this particular update, code commit, or software change.

In the case of this version 1320 of notepad.exe with an added backdoor, the current state of the art would not detect this as malicious software. This is because the context of previous version's behaviors is not currently taken into consideration for detection of malicious activity. Because this backdoored version of notepad.exe claims to be from a known reputable source it would be thought to be benign. Embodiments described herein consider this context and other features automatically and generate an alert based on the historical behavioral context of the software. This combination of techniques is thus able to use expected behavior as a surrogate for developer intent. As this intent changes, embodiments detect and stop malicious software from masquerading as a given software, stopping software supply chain attacks from compromising organizations.

Several optional features are also illustrated in FIG. 1, either of which can be used with the method/system of FIG. 1, both of which can be used with the method/system of FIG. 1, or neither of which can be used: i.e., optional lineage analysis 114 and/or optional cluster analysis 116. Starting with optional lineage analysis block 114 (also shown in FIG. 8A), embodiments may optionally use a series of comparisons based on the particular software lineage to further increase our ability to determine if a new version of software is expected for this particular software product. The input for this block 114 is the comparisons and individual analyses for all files in this software family. The lineage of a software product is determined by the gathered software metadata features, such as product name, version, company, publisher, and file name. This gives a baseline expectation for this software to embodiments to understand the expected intent and features of this software as it has changed over time. This process involves the performing same steps 102, 104, 106, and 108 repeatedly (e.g., first between a first version of the software and a second version of the software, then between the second version of the software and a third version of the software, etc.) to gather from a software's lineage.

The detected lineage for notepad.exe can be observed in the table of FIG. 8B. The two samples shown in FIG. 8B are in addition to the current sample under test. The features extracted from this set of data can then be aggregated into the overall baseline. This can be performed using both embodiments using the scoring system described above and embodiments using the anomaly detection system, also described above. For the scoring system, the scores can be lowered based on the full lineage, rather than only the previous version. This can lead to lowered false positives from updates that revert to previous functionality. For the anomaly detection, using a full lineage gives a fuller understanding to the algorithm of the entire lineage. The output from this block 114 is the aggregated behaviors and features for the samples within this software family. This can be used as optional input to the scoring system 110.

Optionally, at block 116 (also shown in FIG. 9), the data gathered can be used to cluster types of software similar to each other. The input for the cluster analysis is the individual or lineage file features and comparative analysis of all the files in the data corpus. Cluster analysis can be done both with each individual piece of software or with the lineage. This is done using machine learning clustering algorithms and anomaly detection. One such way is k-means clustering. By using the centroid of each piece of software or lineage as a point for the software lineage, nearby software lineages can be determined. This can then change both the scoring system and/or the anomaly detection algorithms to include this similar software as part of the expected behavior set. This can lower the number of identified false malicious positives identified by embodiments related to when software updates contain a new behavior that is common to that type of software. For example, in the case of notepad.exe, it is notionally of the type "word processor", and would lie within the cluster of "word processors." As such, this would lower the false positives related to adding in auto-save related behaviors in an updated version of notepad.exe, because "word processor" software would commonly have the auto-save capability.

The output of block 116 is the nearest clusters of the sample under test for the type of software and the lineage. This can also be used by the anomaly detection algorithm to determine if a software's behavior would classify it within a new cluster of software. If so, this would be anomalous, and trigger detection.

Hardware for implementing these systems and methods may be varied. Embodiments use hardware of a variety of types, depending on the type of software being processed. In the case of software for Windows® operating systems, as graphically depicted in FIG. 10, embodiments could execute using the Windows® host hardware, allowing embodiments to defend the system directly from the system itself. This would allow our implementation to execute against software that is currently on the computer.

This would extend to an embedded system, where processing and memory are limited. Embodiments can still be deployed on this hardware, enabling in situ defense for that hardware as graphically depicted in FIG. 11. Embodiments can also run on Linux-based operating systems or an embedded system with a different hardware profile than the intended software. This ability to run on separate hardware from the software under test would make it more difficult for attackers to compromise embodiments while they are statically generating the behavior profiles described above.

This extends also to cloud computing infrastructure, e.g., as shown in FIG. 12: one embodiment exists within virtual machines within a cloud computing environment. This hardware implementation allows such embodiments to scale horizontally as more processing is needed. As the hardware environment is contained within the cloud, embodiments can be created that use the best hardware architecture for the needs of the software being tested. For instance, a Windows® machine could be used to process Linux, MacOS, and Embedded binaries, each of which could be expected to use a different processor architecture, such as ARM, MIPS, or x86_64, when the cloud machine uses x86_64 processors.

Various embodiments can be expressed as methods, e.g., a method for identifying a risk level associated with an update to a software product. An example 1300 is shown in FIG. 13. Therein, at step 1302, one or more first features are extracted from a first version of the software product. One or more first behaviors, associated with the extracted one or more first features, are identified at step 1304 that can occur when the first version of the software product is executed on a computing device. At step 1306, one or more second features are extracted from a second version of the software product. One or more second behaviors, associated with the extracted one or more second features, are identified at step 1308 that can occur when the second version of the software product is executed. The one or more first behaviors are compared with the one or more second behaviors at step 1310 to identify one or more behavioral differences between the first version of the software product and the second version of the software product. A risk level associated with the one or more behavioral differences is determined at step 1312. An indication of the risk level associated with the second version of the software product is output to a user at step 1314.

Note in steps 1202 and 1206 above it is described that behaviors are identified that "can occur" when a version of the software is executed. This phraseology is intended to indicate that not every execution of a version of software will result in every behavior that the software is capable of demonstrating being exhibited during a given execution. For example, some software behaviors may only occur when a user activates a particular feature within that software or when a particular input is received by the software. Thus, a behavior identified as a characteristic of a software product by these embodiments may not occur for each execution of that software product.

Note that not all of the steps of the techniques described herein are necessarily performed in a single microprocessor or even in a single module.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for identifying a risk level associated with an update to a software product, the method comprising:

extracting one or more first features from a first version of the software product;

identifying one or more first behaviors, associated with the extracted one or more first features, that can occur when the first version of the software product is executed on a computing device;

extracting one or more second features from a second version of the software product;

identifying one or more second behaviors, associated with the extracted one or more second features, that can occur when the second version of the software product is executed;

comparing the one or more first behaviors with the one or more second behaviors to identify one or more behavioral differences between the first version of the software product and the second version of the software product, wherein the step of comparing the one or more first behaviors with the one or more second behaviors to identify one or more behavioral differences between the first version of the software product and the second version of the software product comprises performing function alignment between functions identified in the first version of the software product and functions identified in the second version of the software product;

identifying a risk level associated with the one or more behavioral differences; and outputting an indication of the risk level associated with the second version of the software product to a user;

wherein the step of identifying a risk level associated with the one or more behavioral differences further comprises:

scoring the one or more behavioral differences by one or both of:

(a) reducing a score for each new behavior found in the second version of the software product which was not found in the first version of the software by:

(i) a first value if the new behavior is listed in one of one or more malware behavior libraries; or (ii) a second value if the new behavior is not listed in the one of one or more malware behavior libraries; and (b) reducing the score by a third value for each additional instance of the new behavior found in the second version of the software product.

2. The method of claim 1, wherein the first version of the software product is an aggregate of multiple versions of the software product or an aggregate of multiple versions of multiple software products.

3. The method of claim 1, wherein the one or more first features and the one or more second features include one or more of systems calls, strings, arguments to function calls, instructions, and file sections.

4. The method of claim 1, wherein the step of identifying a risk level associated with the one or more behavioral differences further comprises:

determining whether the one or more behavioral differences are intended or unintended.

5. The method of claim 4, wherein the step of determining whether the one or more behavioral differences are intended or unintended includes one or both of (a) determining that a behavior is unintended because historic behaviors of the software product do not include this behavior; and (b) comparing a behavior to one or more libraries of malware behaviors.

6. The method of claim 1, wherein the step of identifying a risk level associated with the one or more behavioral differences further comprises:

performing an anomaly detection procedure on the one or more second behaviors.

7. The method of claim 1, wherein the step of identifying a risk level associated with the one or more behavioral differences further comprises:

performing a lineage analysis of previous versions of the software product and using output from the lineage analysis to score the risk level.

8. The method of claim 1, wherein the step of identifying a risk level associated with the one or more behavioral differences further comprises:

performing a cluster analysis of previous versions of the software product and using output from the cluster analysis to score the risk level.

9. A non-transitory, computer-readable medium containing computer-readable program code which, when executed on one or more processors, performs the steps of:

extracting one or more first features from a first version of the software product;

identifying one or more first behaviors, associated with the extracted one or more first features, that will can occur when the first version of the software product is executed on a computing device;

extracting one or more second features from a second version of the software product;

identifying one or more second behaviors, associated with the extracted one or more second features, that can occur when the second version of the software product is executed;

comparing the one or more first behaviors with the one or more second behaviors to identify one or more behavioral differences between the first version of the software product and the second version of the software product, wherein the step of comparing the one or more first behaviors with the one or more second behaviors to identify one or more behavioral differences between the first version of the software product and the second version of the software product comprises performing function alignment between functions identified in the first version of the software product and functions identified in the second version of the software product;

identifying a risk level associated with the one or more behavioral differences; and outputting an indication of the risk level associated with the second version of the software product to a user;

wherein the step of identifying a risk level associated with the one or more behavioral differences further comprises:

scoring the one or more behavioral differences by one or both of:

(a) reducing a score for each new behavior found in the second version of the software product which was not found in the first version of the software by:

(i) a first value if the new behavior is listed in one of one or more malware behavior libraries; or (ii) a second value if the new behavior is not listed in the one of one or more malware behavior libraries; and (b) reducing the score by a third value for each additional instance of the new behavior found in the second version of the software product.

10. The non-transitory, computer-readable medium of claim 9, wherein the first version of the software product is an aggregate of multiple versions of the software product or an aggregate of multiple versions of multiple software products.

11. The non-transitory, computer-readable medium of claim 9, wherein the one or more first features and the one or more second features include one or more of systems calls, strings, arguments to function calls, instructions, and file sections.

12. The non-transitory, computer-readable medium of claim 9, wherein the step of identifying a risk level associated with the one or more behavioral differences further comprises:

determining whether the one or more behavioral differences are intended or unintended.

13. The non-transitory, computer-readable medium of claim 12, wherein the step of determining whether the one or more behavioral differences are intended or unintended includes one or both of (a) determining that a behavior is unintended because historic behaviors of the software product do not include this behavior; and (b) comparing a behavior to one or more libraries of malware behaviors.

14. The non-transitory, computer-readable medium of claim 9, wherein the step of identifying a risk level associated with the one or more behavioral differences further comprises:

performing an anomaly detection procedure on the one or more second behaviors.

15. The non-transitory, computer-readable medium of claim 9, wherein the step of identifying a risk level associated with the one or more behavioral differences further comprises:

performing a lineage analysis of previous versions of the software product and using output from the lineage analysis to score the risk level.

16. The non-transitory, computer-readable medium of claim 9, wherein the step of identifying a risk level associated with the one or more behavioral differences further comprises:

performing a cluster analysis of previous versions of the software product and using output from the cluster analysis to score the risk level.

17. A method for identifying a risk level associated with an update to a software product, the method comprising:

extracting one or more first features from a first version of the software product;

identifying one or more first behaviors, associated with the extracted one or more first features, that can occur when the first version of the software product is executed on a computing device;

extracting one or more second features from a second version of the software product;

identifying one or more second behaviors, associated with the extracted one or more second features, that can occur when the second version of the software product is executed;

comparing the one or more first behaviors with the one or more second behaviors to identify one or more behavioral differences between the first version of the software product and the second version of the software product;

identifying a risk level associated with the one or more behavioral differences; and outputting an indication of the risk level associated with the second version of the software product to a user;

wherein the step of comparing the one or more first behaviors with the one or more second behaviors to identify one or more behavioral differences between the first version of the software product and the second version of the software product further comprises:

performing function alignment between functions identified in the first version of the software product and functions identified in the second version of the software product by:

generating a Term Frequency-Inverse Document Frequency (TF-IDF) vector from position-independent code hashes of each function and each block, position dependent code hashes of each function and each block, function name, function identifier, number of blocks in the function, and the number of instructions in the function; and using k-nearest neighbors with cosine similarity to determine which functions between the first version and the second version are most alike.

18. A non-transitory, computer-readable medium containing computer-readable program code which, when executed on one or more processors, performs the steps of:

extracting one or more first features from a first version of the software product;

identifying one or more first behaviors, associated with the extracted one or more first features, that can occur when the first version of the software product is executed on a computing device;

extracting one or more second features from a second version of the software product;

identifying one or more second behaviors, associated with the extracted one or more second features, that can occur when the second version of the software product is executed;

comparing the one or more first behaviors with the one or more second behaviors to identify one or more behavioral differences between the first version of the software product and the second version of the software product;

identifying a risk level associated with the one or more behavioral differences; and outputting an indication of the risk level associated with the second version of the software product to a user wherein the step of comparing the one or more first behaviors with the one or more second behaviors to identify one or more behavioral differences between the first version of the software product and the second version of the software product further comprises:

performing function alignment between functions identified in the first version of the software product and functions identified in the second version of the software product by:

generating a Term Frequency-Inverse Document Frequency (TF-IDF) vector from position-independent code hashes of each function and each block, position dependent code hashes of each function and each block, function name, function identifier, number of blocks in the function, and the number of instructions in the function; and using k-nearest neighbors with cosine similarity to determine which functions between the first version and the second version are most alike.

\* \* \* \* \*